March 26, 1929.  S. MILNE  1,706,935

APPARATUS FOR CUTTING GRASS IN CONNECTION WITH PAPER MAKING

Filed May 26, 1925

Inventor:- Samuel Milne

By his Attorney:- Walter Gunn

Patented Mar. 26, 1929.

1,706,935

UNITED STATES PATENT OFFICE.

SAMUEL MILNE, OF EDINBURGH, SCOTLAND.

APPARATUS FOR CUTTING GRASS IN CONNECTION WITH PAPER MAKING.

Application filed May 26, 1925, Serial No. 33,039, and in Great Britain April 3, 1925.

This invention relates to apparatus for the treatment of grass such as esparto, sabui, straw, reeds or the like used for paper making.

The object of this invention is to provide an improved construction of grass cutting apparatus.

According to the invention the improved machine comprises two shafts, toothed circular knives and intermediate spacing collars detachably mounted on each shaft, the knives on one shaft overlapping the knives on the other shaft so as to co-operate to cut the grass, means for driving the knives and means for clearing the spaces between the knives. The knives are all adapted to turn with their respective shafts and if desired one knife only may be fixed longitudinally whilst the others are free to move endwise. Preferably one only of the shafts is driven and provision is made to adjust one or both of said shafts endwise to ensure that the cutting edges of the knives are kept in close contact.

The accompanying drawings illustrate one form of the invention, in which.

Figure 1:
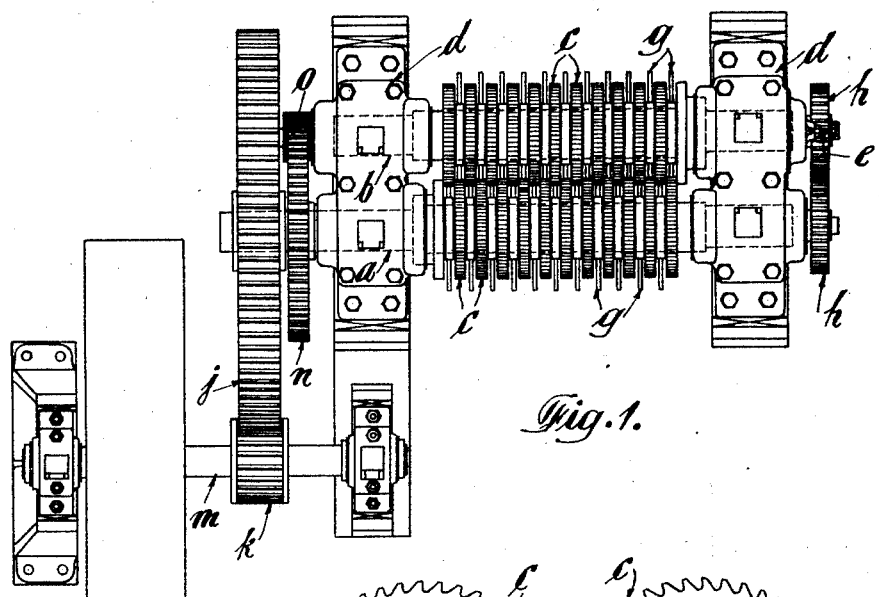
Fig. 1 is a plan.
Figure 2:
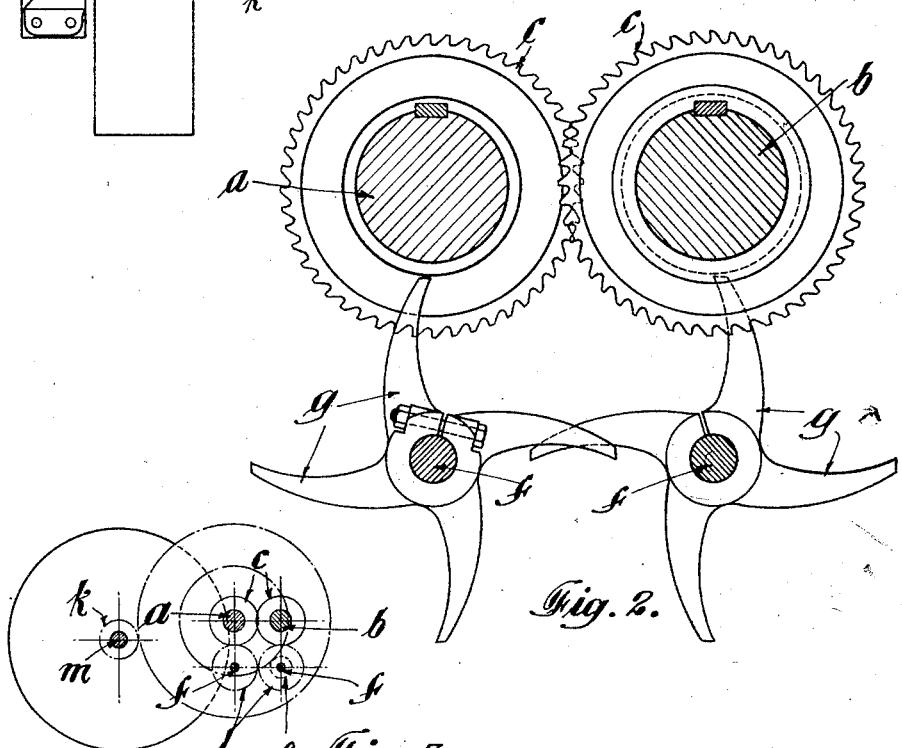
Fig. 2 is an enlarged section showing the arrangement of the knives and clearers.
Figure 3:
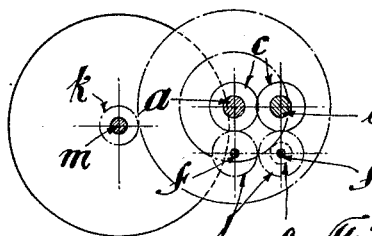
Fig. 3 is a diagram showing the relative position of the gearing.

As illustrated, the improved machine comprises two parallel shafts $a$, $b$ each fitted with a series of toothed disc knives $c$, with intermediate spacing washers, the knives on the shaft $a$ overlapping the knives on the shaft $b$ so as to co-operate with them to cut the grass by a shearing action, see Fig. 2, tne width of the knives determining the length of the cut grass.

The knives, which are serrated as shown, are keyed to their respective shafts, one end knife being fixed and the other knives being slidably adjustable thereon. The shafts $a$ and $b$ are mounted in bearings $d$, $d$ suitable means being provided for lateral adjustment of the knives, such as a lateral adjustment screw $e$ for the shaft $b$, the fixed knife on the two shafts being at opposite ends.

Arranged below the two shafts $a$ and $b$ are two parallel shafts $f$ on which are mounted rotary clearers, the arms of which are arranged to enter the spaces between the knives and remove any grass remaining therein. The two shafts $f$ are mounted in the bearings $d$ and are geared together at one end by pinions $h$.

The shaft $a$ is arranged to be driven by suitable gearing $j$ and $k$ from a countershaft $m$ and on the shaft $a$ is a pinion $n$ meshing with a pinion $o$ on the shaft $f$ below the shaft $b$.

The knives are changeable so that broader or narrower knives may be used to vary the length of the cut grass, and the clearers and spacers between them will be similarly changeable.

In operation the shaft $a$ and the clearers $g$ are driven, the knives on the shaft $b$ are adjusted into contact with the knives on the shaft $a$ and will be thereby rotated, nonrotation of the shaft $b$ generally being an indication that the knives are not closely enough adjusted. The serrations on the knives of the shaft $a$ grip the grass and carry it down on to the knives of the shaft $b$, each knife shearing off lengths of grass between the adjacent knives on the opposite shaft. The clearers $g$, which are driven about 5 to 1 from the shaft $a$, enter the spaces between the knives and pull out any grass which has not fallen out below as the knives separate. Owing to the contact between the cutting edges of the knives there is a slight but appreciable wearing action which, where both knives are driven, causes the faces of the knives to become grooved by the teeth of the engaging wheel. Such grooving does not occur when only one knife shaft is driven, as the knives slip a little and distribute the wear evenly, the edges becoming highly polished and the knives maintaining their sharpness.

What I claim and desire by Letters Patent is:—

1. A machine for treating grass in connection with paper making, comprising two shafts, double-edged toothed circular knives and intermediate spacing collars detachably mounted on each shaft to rotate therewith, the knives on one shaft overlapping the knives on the other shaft so as to co-operate as shears to cut the grass, means for driving at least one of the shafts and means for clearing the spaces between the knives, comprising rotary clearers, mounted below each knife shaft, having tapered forwardly curved arms arranged to enter the spaces between the knives to the full depth thereof, the arms of the adjacent clearers overlapping, as set forth.

2. A machine for treating grass in connection with paper making comprising two shafts, double-edged toothed circular knives and intermediate spacing collars detachably mounted on each shaft to rotate therewith the knives on one shaft overlapping the knives on the other shaft so as to co-operate in facial engagement as shears to cut the grass, means for maintaining the operative facial engagement of the knives, means for driving at least one of the shafts and means for clearing the spaces between the knives, comprising rotary clearers, mounted below each knife shaft, having tapered forwardly curved arms arranged to enter the spaces between the knives to the full depth thereof, the arms of the adjacent clearers overlapping, as set forth.

3. A machine for treating grass in connection with paper making comprising two shafts, a plurality of double-edged toothed circular knives and intermediate spacing collars detachably and slidably mounted on each shaft but constrained to rotate with their respective shafts, the knives on one shaft over-lapping the knives on the other shaft so as to co-operate facially therewith as shears to cut the grass, means on each shaft at opposite ends for limiting the axial movement of the knives thereon, means for laterally adjusting at least one of said shafts and means for clearing the spaces between the knives, comprising rotary clearers, mounted below each knife shaft, having tapered forwardly curved arms arranged to enter the spaces between the knives to the full depth thereof, the arms of the adjacent clearers overlapping, as set forth.

4. A machine for treating grass in connection with paper making comprising two shafts, double-edged toothed circular knives and intermediate spacing collars detachably mounted on each shaft to rotate therewith, the knives on one shaft overlapping the knives on the other shaft so as to co-operate as shears to cut the grass, means for driving at least one of the shafts and rotary clearers operably arranged to clear the spaces between the knives, comprising rotary clearers, mounted below each knife shaft, having tapered forwardly curved arms arranged to enter the spaces between the knives to the full depth thereof, the arms of the adjacent clearers overlapping, as set forth.

5. A machine for treating grass in connection with paper making comprising two shafts, a plurality of double-edged toothed knives and intermediate spacing collars detachably and slidably mounted on each shaft and constrained to rotate therewith, the knives on one shaft over-lapping the knives on the other shaft so as to co-operate facially as shears to cut the grass, means on each shaft at opposite ends for limiting the axial movement of the knives thereon, means for adjusting one of said shafts axially, means for driving the other of said shafts, a clearer shaft mounted below each knife shaft, tapered forwardly curved clearer arms mounted on each clearer shaft arranged to enter to the full depth thereof the spaces between the knives on the shaft immediately above, the clearer arms on the adjacent shafts overlapping, and means for driving said clearer shafts, as set forth.

In testimony whereof I have signed my name to this specification.

SAMUEL MILNE.